(12) United States Patent
Mulder et al.

(10) Patent No.: US 9,814,182 B2
(45) Date of Patent: Nov. 14, 2017

(54) INCLINED CONVEYOR FOR COMBINE HARVESTERS WITH NEGATIVE PRESSURE INLET

(71) Applicant: Arnold Jäger Holding GmbH, Hannover (DE)

(72) Inventors: Jan-Harm Mulder, Dalen (NL); Johan Oord, Groningen (NL); Sebastian Jäger, Hannover (DE)

(73) Assignee: Arnold Jäger Holding GmbH, Hannover (DE)

( * ) Notice: Subject to any disclaimer, the term of this patent is extended or adjusted under 35 U.S.C. 154(b) by 0 days.

(21) Appl. No.: 14/549,111

(22) Filed: Nov. 20, 2014

(65) Prior Publication Data
US 2015/0141099 A1 May 21, 2015

Related U.S. Application Data

(63) Continuation of application No. PCT/DE2013/100179, filed on May 16, 2013.

(30) Foreign Application Priority Data

May 21, 2012 (DE) ........................ 10 2012 009 979

(51) Int. Cl.
*A01D 61/00* (2006.01)
*B65G 15/52* (2006.01)
(Continued)

(52) U.S. Cl.
CPC .......... *A01D 61/008* (2013.01); *A01D 61/00* (2013.01); *A01D 61/04* (2013.01); *A01F 12/10* (2013.01);
(Continued)

(58) Field of Classification Search
USPC ............. 198/848, 728; 56/15.3, 16.4 R, 181, 56/14.5, 345, 350
See application file for complete search history.

(56) References Cited

U.S. PATENT DOCUMENTS 285,664 A * 9/1883 Pearce ................... B65G 19/10
198/728
2,588,984 A * 3/1952 Kubisiak .............. B65G 17/063
198/850
(Continued)

FOREIGN PATENT DOCUMENTS

DE 0861071 12/1952
DE 1199039 8/1965
(Continued)

OTHER PUBLICATIONS

German Office Action dated Feb. 11, 2013 in priority application No. DE10 2012 010280, filed May 21, 2012, priority for U.S. Appl. No. 14/548,813 (4 pages).
(Continued)

*Primary Examiner* — Alicia Torres
(74) *Attorney, Agent, or Firm* — Shlesinger, Arkwright & Garvey LLP (57) ABSTRACT

An inclined conveyor for a combine harvester has two drive elements which define a conveying direction and revolve in a conveying duct. Conveying duct is divided into an overshot return duct and an undershot conveying duct by a separating element situated between the upper run and the lower run of the drive element. Drive element is interconnected by carriers situated transversely with respect to conveying direction that convey harvested crop in undershot conveying duct. The difference in speed between the carrier bars and harvested crop stream is eliminated, and at least reduced, by additional acceleration of harvested crop stream. Carrier bars serve as carriers, and as acceleration elements (Continued)

for the harvested crop. That is because the cross section of each of the carrier bars viewed in conveying direction, occupies at least 30% of the smallest internal cross section of undershot conveying duct.

15 Claims, 6 Drawing Sheets (51) Int. Cl.
    *A01D 61/04*     (2006.01)
    *A01F 12/10*     (2006.01)
    *B65G 19/06*     (2006.01)
    *B65G 19/24*     (2006.01)

(52) U.S. Cl.
    CPC .............. *B65G 15/52* (2013.01); *B65G 19/06* (2013.01); *B65G 19/24* (2013.01)

(56) References Cited

U.S. PATENT DOCUMENTS

| | | | |
|---|---|---|---|
| 2,906,395 A | 9/1959 | Greer | 198/850 |
| 2,956,385 A * | 10/1960 | Porter | A01D 45/22 460/128 |
| 3,253,699 A * | 5/1966 | Schneider | A01D 17/10 198/494 |
| 3,315,788 A * | 4/1967 | Anderson | A01D 17/10 198/690.2 |
| 3,339,712 A * | 9/1967 | Anderson | A01D 17/10 198/834 |
| 3,555,790 A | 1/1971 | Quick | |
| 3,589,502 A | 6/1971 | Maillet | |
| 3,618,747 A * | 11/1971 | Hammond | A01D 17/10 198/848 |
| 3,699,753 A * | 10/1972 | Peak | A01D 61/04 56/14.5 |
| 3,734,269 A * | 5/1973 | Ross | A01D 33/08 198/698 |
| 3,780,851 A * | 12/1973 | Bichel | B65G 19/22 198/730 |
| 3,976,192 A | 8/1976 | Muller | 198/835 |
| 3,985,224 A | 10/1976 | Harvey | 198/851 |
| 4,023,671 A * | 5/1977 | Kramer | F16G 3/08 198/699 |
| 4,653,632 A | 3/1987 | Timmer et al. | 198/867.14 |
| 4,712,668 A | 12/1987 | Gray | |
| 4,724,909 A | 2/1988 | Link | 171/126 |
| 4,815,587 A * | 3/1989 | Musil | B65G 15/52 198/728 |
| 4,965,993 A | 10/1990 | Butler | A01D 31/00 198/510.1 |
| 5,099,548 A | 3/1992 | Loosli | 24/38 |
| 5,168,981 A | 12/1992 | Ruff | 198/850 |
| 5,176,248 A | 1/1993 | Allen et al. | 198/850 |
| 5,358,095 A * | 10/1994 | Curl | B65G 17/44 171/131 |
| 5,480,352 A * | 1/1996 | Luscombe | A01D 17/10 198/731 |
| 5,671,839 A | 9/1997 | Sanderson | 198/848 |
| 5,692,598 A | 12/1997 | Röhrs | |
| 5,738,223 A | 4/1998 | Rohrs | 209/307 |
| 6,106,391 A | 8/2000 | Tjabringa | 460/144 |
| 6,896,125 B2 | 5/2005 | Webster et al. | 198/844.2 |
| 6,997,194 B2 * | 2/2006 | Maconachy | A01D 45/26 134/199 |
| 7,182,202 B2 | 2/2007 | Kalverkamp | 198/844.1 |
| 7,308,786 B2 | 12/2007 | Mulder | 56/16.4 R |
| 7,766,736 B2 * | 8/2010 | Ramp | A01F 12/10 460/16 |
| 9,033,138 B2 | 5/2015 | Mulder | |
| 9,033,139 B2 | 5/2015 | Jäger | |
| 2004/0250523 A1 | 12/2004 | Schulz | |
| 2005/0109000 A1 * | 5/2005 | Mulder | A01D 17/10 56/16.4 R |
| 2008/0202405 A1 | 8/2008 | Kern | |
| 2012/0043263 A1 | 2/2012 | Kalverkamp | |
| 2012/0186949 A1 | 7/2012 | Gentz | |
| 2015/0141098 A1 | 5/2015 | Mulder | |
| 2015/0173298 A1 | 6/2015 | Jäger | |

FOREIGN PATENT DOCUMENTS

| | | | |
|---|---|---|---|
| DE | 2715108 | 12/1978 | |
| DE | 34 41 605 A1 | 5/1986 | |
| DE | 3737066 | 6/1989 | |
| DE | 3733712 C2 | 7/1992 | ............ B65G 15/52 |
| DE | 41 32 246 A1 | 4/1993 | |
| DE | 4311054 | 10/1994 | |
| DE | 195 20 925 A1 | 12/1996 | |
| DE | 195 20 927 A1 | 12/1996 | |
| DE | 297 03 270 U1 | 5/1997 | |
| DE | 200 11 436 U1 | 11/2000 | |
| DE | 10308823 | 9/2004 | |
| DE | 102004023705 B3 | 6/2005 | |
| DE | 10 2005 027 841 A1 | 1/2007 | |
| DE | 102005027841 A1 | 1/2007 | |
| DE | 202007015687 | 2/2008 | |
| DE | 10 2007 049 839 | 6/2009 | |
| DE | 102009036104 | 2/2011 | |
| DE | 10 2009 036104 B4 | 2/2012 | |
| DE | 10 2010 035043 | 2/2012 | |
| EP | 0080238 | 6/1983 | |
| EP | 1733607 B1 | 7/2008 | |
| WO | 9523497 | 8/1995 | |

OTHER PUBLICATIONS

International Search Report (ISR) in parent PCT application No. PCT/DE2013/100180, ISR dated Aug. 21, 2013 for U.S. Appl. No. 14/548,813 (6 pages).
International Search Report (ISR) from parent PCT application No. PCT/DE2013/100179, ISR dated Aug. 21, 2013 in this U.S. Appl. No. 14/548,111 (6 pages).
German Office Action dated Feb. 12, 2013 in priority application No. DE10 2012 009 979.7, filed May 21, 2012 for this U.S. Appl. No. 14/549,111 (4 pages).
EPO Office Action, dated Oct. 27, 2014, in counterpart European Application No. 14 17 1472 filed Jun. 6, 2014, which claimed the priority of U.S. Appl. No. 13/916,277, filed Jun. 12, 2013, now U.S. Pat. No. 9,033,139, issued May 19, 2015. (7 pages).
EPO Office Action, dated Nov. 7, 2014 in counterpart European Application No. 14 17 1465 filed Jun. 6, 2014, which claims the priority of U.S. Appl. No. 13/916,224, filed Jun. 12, 2013, now U.S. Pat. No. 9,033,138, issued May 19, 2015 (8 pages).

\* cited by examiner

INCLINED CONVEYOR FOR COMBINE HARVESTERS WITH NEGATIVE PRESSURE INLET

RELATED APPLICATIONS

This is a continuation of International PCT Application No. PCT/DE2013/100179, filed on May 16, 2013, which claims priority from Germany Application No. 10 2012 009 979.7, filed May 21, 2012, both of which are hereby incorporated by reference.

FIELD OF THE INVENTION

The present invention relates to an inclined conveyor for a combine harvester according to the preamble of claim 1.

BACKGROUND OF THE INVENTION

Combine harvesters are equipped with an attachment which has a reel for collecting the harvested crop, and a cross auger, situated downstream from the reel, which compacts the harvested crop and conveys it toward the center to an inclined conveyor. The inclined conveyor is situated in a duct, and conveys the harvested crop into a threshing device of the combine harvester.

Inclined conveyors of this general type for combine harvesters are well known in the prior art, for example from DE 1199039, U.S. Pat. No. 3,555,790, DE 4132246 A1, DE 4311054 C2, DE 102009036104 B4, EP 1733607 B1, and DE 102005027841 A1. These inclined conveyors have at least two endless traction means which extend in parallel to one another and which are interconnected by carrier bars situated transversely with respect to the conveying direction. The carrier bars feed the harvested crop into an undershot conveyor duct of a threshing unit of the combine harvester. The carrier bars are connected to the traction means by screws.

The endless traction means revolve in a conveyor duct whose end faces are open toward the reel and the threshing unit, but which are otherwise closed all around. The conveyor duct is divided into an undershot conveyor duct and an overshot return duct by means of an intermediate floor which is situated between the upper run and the lower run of the traction means and which extends over a large portion of the length of the conveyor duct.

Standard steel profiles such as U, L, and T profiles which are not heat-treated are used as carrier bars according to the prior art. These carrier bars have a low profile height and a limited conveying action due to their low form resistance to the harvested crop. In addition, the profiles are very smooth, and therefore have a very low degree of frictional engagement with the harvested crop. Due to the friction of the harvested crop at the bottom of the conveyor duct and the moderate entrainment effect of the carrier bars, during operation there is a considerable difference in speed between the carrier bars and the harvested crop stream (slip). This results in a high level of energy consumption, a high degree of wear, a high load on the traction means, and a premature threshing effect.

It is known from the prior art to eliminate or at least reduce the above-described slip between the carrier bars and the harvested crop stream via aerodynamic measures. A combine harvester is described in U.S. Pat. No. 3,555,790 in which a threshing cylinder situated at the outlet of the conveyor duct of the inclined conveyor is redesigned in such a way that it acts as a fan, and thus exerts a suction effect on the harvested crop present in the conveyor duct.

A similar approach is described in EP 1 733 607 B1. The chains of this inclined conveyor, which are used as traction means, revolve around a lower traction means guide and an upper traction means guide. The upper traction means guide has a drive shaft upon which chain wheels used for driving the chains rest in a rotationally fixed manner. A drum which is provided with bars or pins on its shell is situated on the drive shaft, between the chain wheels. Due to this design, the upper traction means guide likewise exerts a suction effect on the harvested crop present in the conveyor duct, thus reducing the difference in speed between the carrier bars and the harvested crop stream.

SUMMARY OF THE INVENTION

An object of the invention is to provide a further inclined conveyor of this type for a combine harvester, wherein the difference in speed between the carrier bars and the harvested crop stream is eliminated, but at least reduced, by additional acceleration of the harvested crop stream.

This object is achieved according to the invention by an inclined conveyor having the features of claim 1.

Due to the at least 30% overlap of the smallest internal cross section of the undershot conveyor duct by the carrier bars, the carrier bars act as a fan and produce a negative pressure at the inlet of the conveyor duct. The harvested crop is thus additionally accelerated, and the conveying action of the carrier bars is aerodynamically assisted. It is thus possible, with the same conveying capacity, to reduce the belt speed, and thus the energy consumption and the wear. Reducing the slip between the harvested crop and the carrier bars results in gentler conveying of the harvested crop and fewer broken grains, and a decrease in premature threshing.

In an advantageous embodiment of the invention, the relatively large cross section of the carrier bars is achieved by using rods with a circular cross section instead of the heavy standard steel profiles known from the prior art. Although they are lightweight in comparison to the standard steel profiles, rods having such a cross section absorb bending moments and torsional moments acting on them in an ideal manner during operation of the inclined conveyor.

If only one circular rod is provided for each carrier bar, it is necessary to furnish the circular rod with a casing which increases friction, on the one hand in order to increase the conveying cross section of the carrier bar, and on the other hand to improve the frictional engagement with the harvested crop and to thus increase the entrainment effect.

Instead of only one rod having a circular cross section, the carrier bars may have at least two rods having a circular cross section, which are situated one on top of the other in the conveying stream and are connected as individual rods to the traction means or drive means or drive elements. These at least two rods may likewise be provided with a casing which increases friction in order to increase the conveying cross section and the entrainment effect on the harvested crop.

Further advantageous embodiments of the invention result from the other dependent claims.

BRIEF DESCRIPTION OF THE DRAWINGS

The invention is explained in greater detail below with reference to embodiments. In the accompanying drawings.

DETAILED DESCRIPTION OF THE INVENTION

Figure 1:
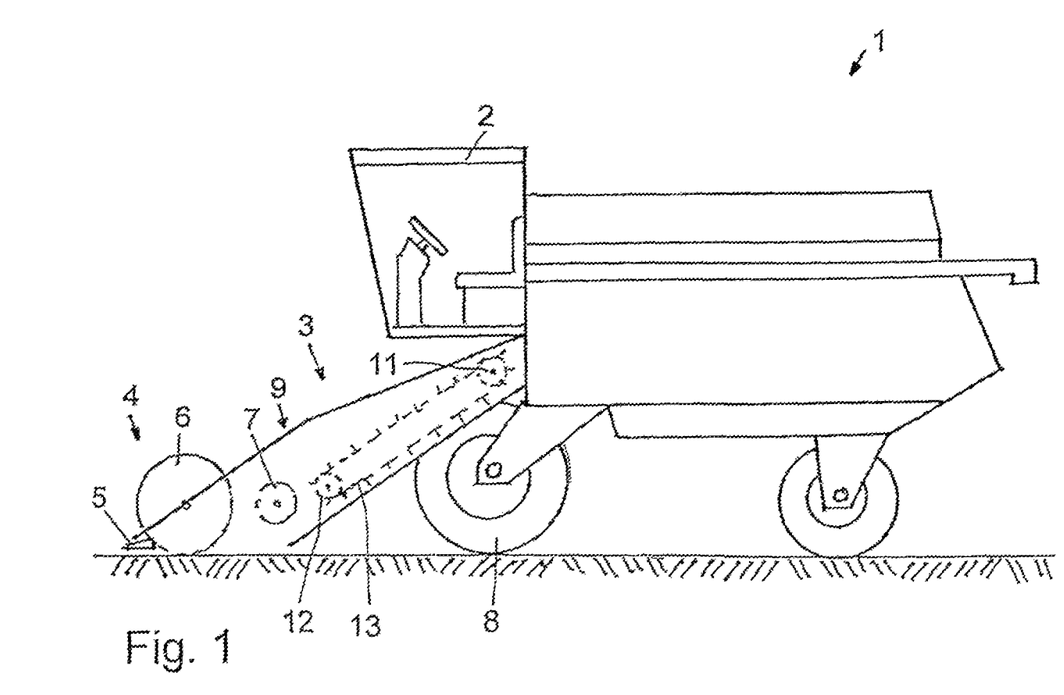
FIG. 1 shows a schematic side view of a combine harvester having a cutter unit and an inclined conveyor.

FIG. 1 shows a self-propelled combine harvester 1. Beneath the driver's cab 2, an inclined conveyor 3 extends downwardly toward the front. On its front end the inclined conveyor carries a cutter unit 4 made up of a cutter bar 5, a reel 6, and a cross auger 7. The cutter unit 4 is significantly wider than the combine harvester 1, and customarily extends transversely beyond the front drive wheels 8 of the combine harvester, while the inclined conveyor 3 is narrower. The harvested crop is cut by the cutter bar 5, collected by the reel 6, and supplied to the cross auger 7. The cross auger 7 compacts the harvested crop and conveys it toward the center, and supplies it to the inclined conveyor 3, which is situated in a duct 9.

Figure 2:
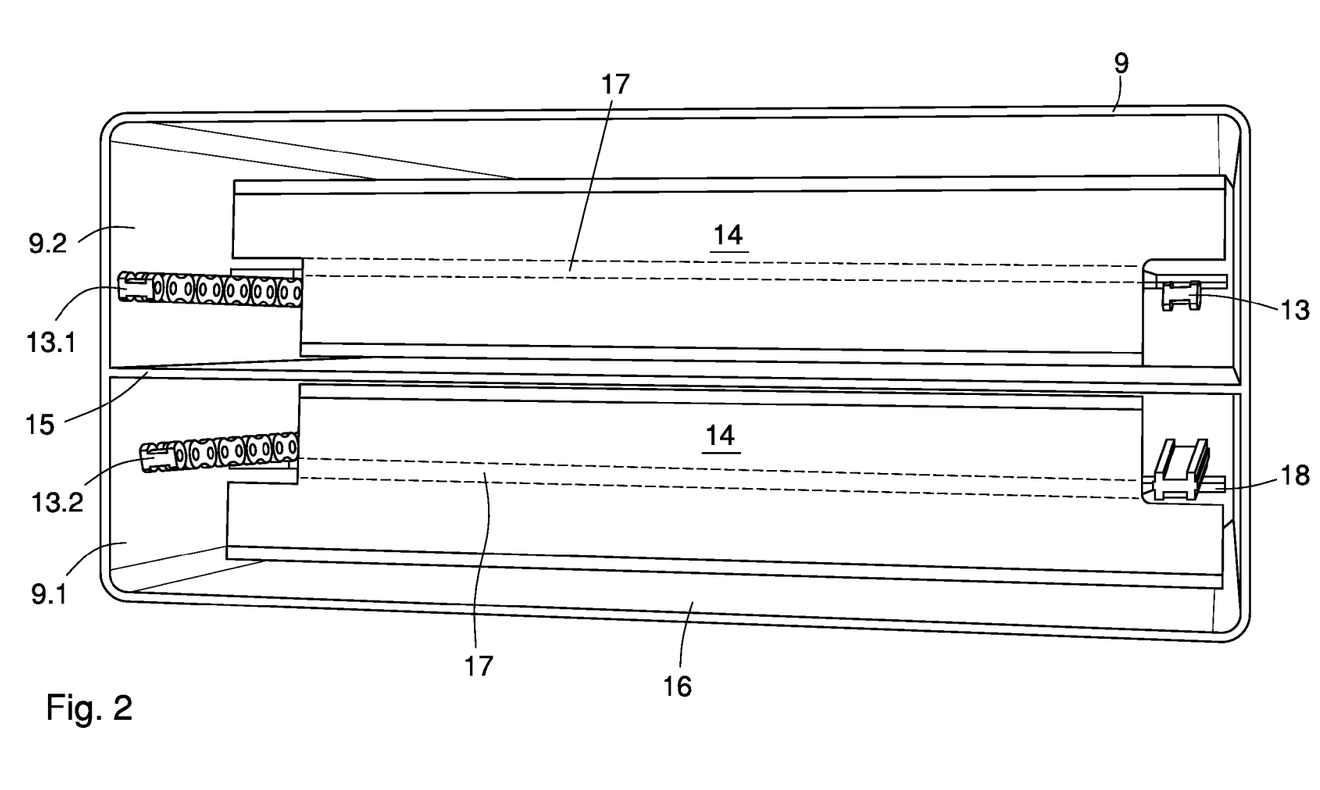
FIG. 2 shows a perspective view into the conveyor duct of the inclined conveyor together with carrier bars, according to a first embodiment of the invention.

As is best seen in FIG. 2, the inclined conveyor 3 has a conveying direction and includes two endless traction means or drive means or drive elements or drives 11 and 12 for traction means 13 (see also FIG. 1) which extend in parallel to one another and which are interconnected by carrier bars 14 situated transversely with respect to the conveying direction. The traction means 13 revolve around an upper traction means guide 11 and a lower traction means guide 12 in the duct 9, the upper traction means guide 11 being driven, and the lower traction means guide 12 co-rotating. An intermediate floor 15, which serves as a separating element, divides the duct 9 into an undershot conveyor duct 9.1 and an overshot return duct 9.2, is situated between the upper run 13.1 and the lower run 13.2 of the traction means 13. Intermediate floor 15 is the separating element or separator 15 yielding undershot conveyor duct 9.1 and an overshot return duct 9.2, as shown and described above and throughout. Intermediate floor 15 extends to lateral walls of the duct and is adjacent the duct, as shown in FIG. 2. The inclined conveyor 3 feeds the harvested crop on a bottom wall 16 of the conveyor duct 9.1 to a threshing unit (not illustrated) of the combine harvester 1.

In the embodiments, the traction means 13 is a roller chain. A cam belt made of a polymer reinforced with high tensile strength plies may be used as the traction means 13 instead of a roller chain. This has the advantage that elongation of the traction means 13 due to wear, and thus, abrasion of the carrier bars 14 against the duct walls, is avoided.

In the embodiment according to FIG. 2, the carrier bars 14 have a rod 17 with a circular cross section. At their ends, each of the rods 17 is provided with a flattened area 18 which is used to fasten the rod 17 to the traction means 13. This fastening is explained in greater detail below with reference to the embodiment according to FIG. 5.

Figure 3:
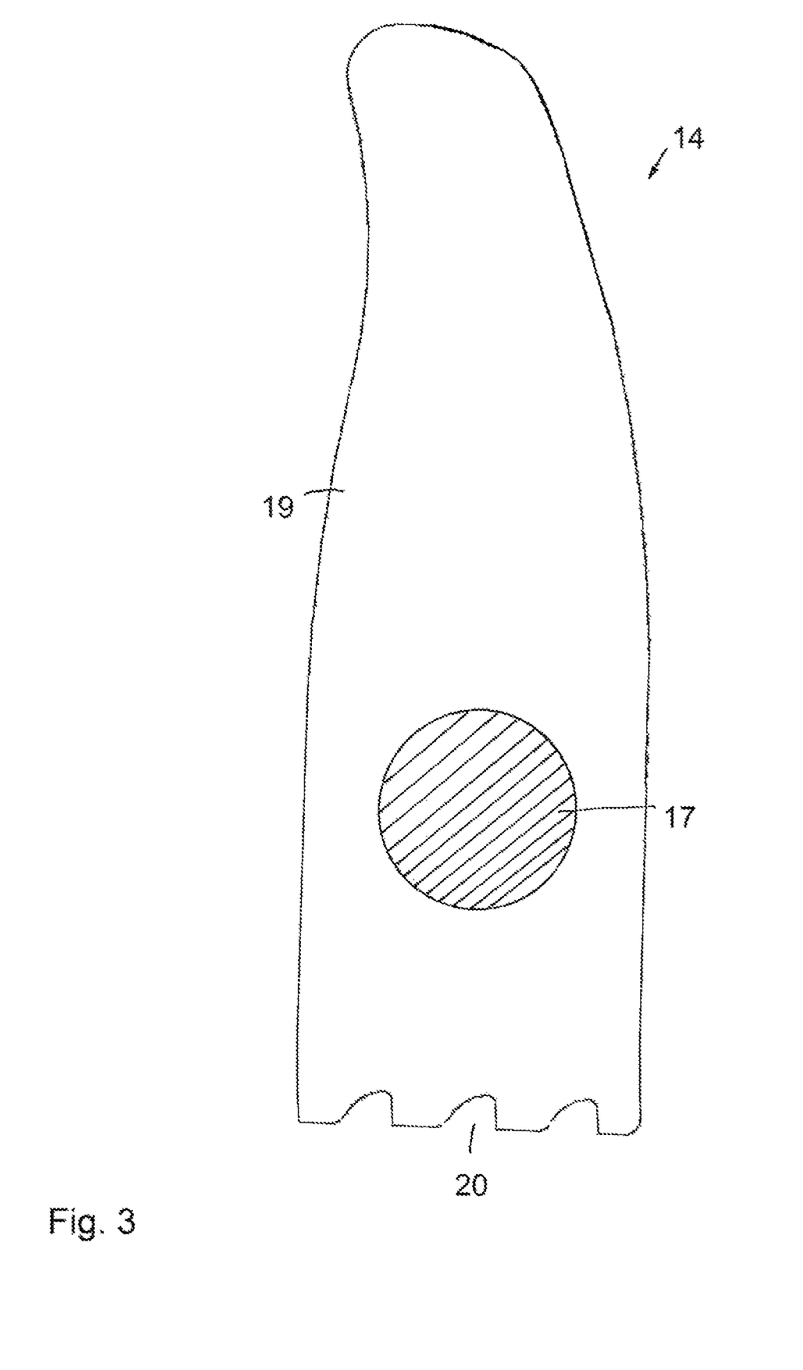
FIG. 3 shows a cross section of a carrier bar according to FIG. 2.

FIG. 3 shows a cross section of a carrier 14 according to the embodiment in FIG. 2. It is apparent from the figure that the rod 17 has a casing 19 having the shape of a wing that is approximately perpendicular to the plane of the conveyor. The casing 19 is made of a material with a high coefficient of friction, such as rubber. This casing 19 improves the frictional engagement of the carrier bars 14 with the harvested crop, and thus increases the entrainment effect. Grooves 20 which are also intended to assist in improving the entrainment effect are provided in an end face which faces the bottom wall 16.

It is apparent from the illustration according to FIG. 2 that the cross section of each carrier bar 14, viewed in the conveying direction, occupies more than 50% of the internal cross section of the undershot conveyor duct 9.1.

Figure 4:
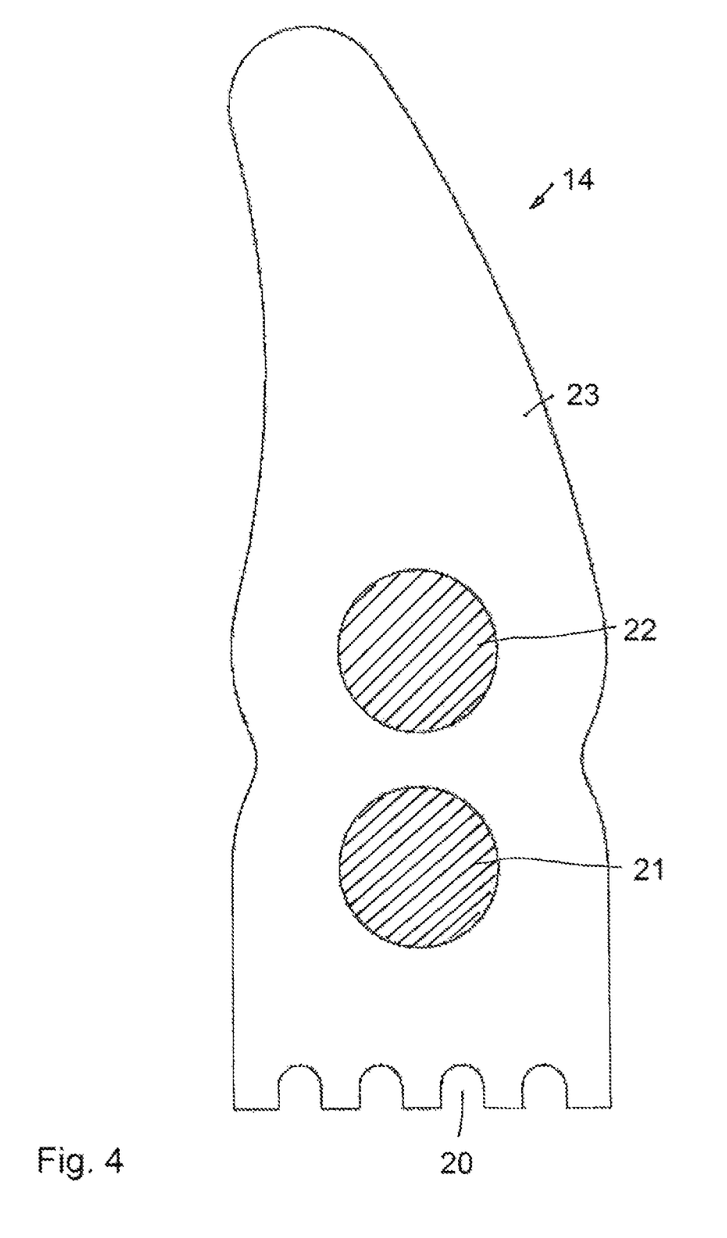
FIG. 4 shows an illustration similar to FIG. 3 of a second embodiment of the invention.
Figure 5:
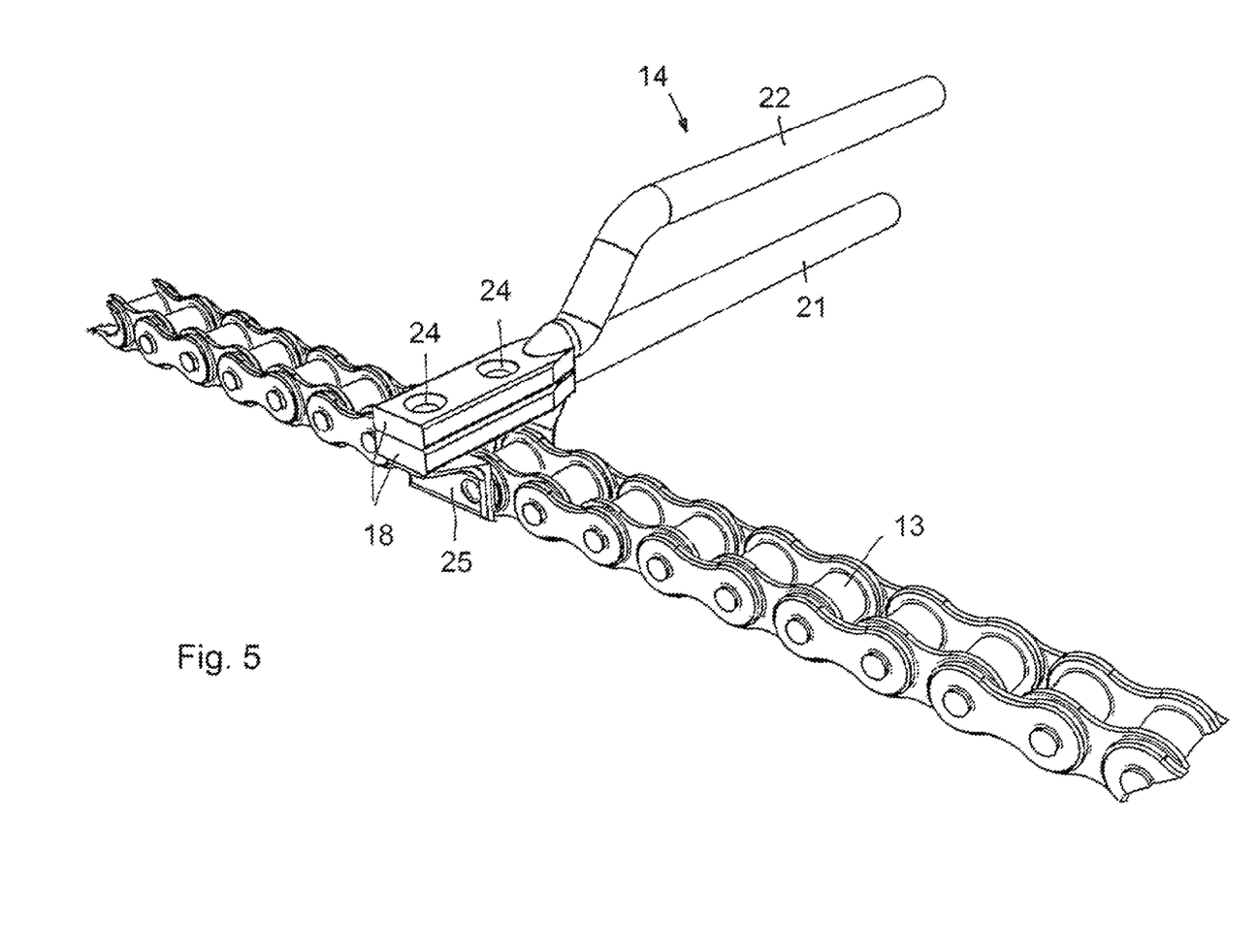
FIG. 5 shows a perspective view of the connecting point between a traction means and a carrier bar according to a third embodiment of the invention.

FIG. 4 shows a cross section of a carrier bar 14 in another embodiment of the invention. This carrier bar 14 has two rods 21, 22 with a circular cross section, as illustrated in FIG. 5. In contrast to the illustration according to FIG. 5, the two rods 21, 22 have a shared casing 23 made of a material which increases friction, such as rubber. This carrier bar 14 likewise once again has the shape of a wing that is approximately perpendicular to the plane of the conveyor. With this carrier bar 14, the same overlap of the internal cross section of the undershot conveyor duct 9.1 is achieved as for the embodiment according to FIG. 3.

In the embodiment according to FIG. 5, the carrier bars 14, the same as the embodiment explained above, are made up of two rods 21, 22 with a circular cross section. At their ends, each of the rods 21, 22 is provided with a flattened area 18 which is used to fasten the rods 21, 22 to the traction means 13. For this purpose, the flattened areas 18 are provided with two through holes 24 separated at a distance from one another. For fastening the rods 21, 22 to the traction means 13, the flattened areas 18 are placed one on top of the other so that their through holes 24 are mutually aligned. At the fastening points, the flattened areas 18 rest on flange plates 25 which are attached to the traction means 13, and which in each case are provided with a through hole, not visible in the drawing, the distance between these through holes corresponding to the distance between the through holes 24 in the flattened areas 18. For fastening the rods 21, 22 to the traction means 13, rivets (not illustrated in the drawing) are inserted through the aligned through holes 24 in the flattened areas 18 and the flange plates 25, and riveted. Of course, a screw connection may also be used instead of a rivet connection.

In the embodiment according to FIG. 5, the rod 21 is straight, while the rod 22 in the harvested crop stream is bent. The rods 21, 22 are produced from cold-drawn wire or hot-rolled, tempered wire. The rods may also be made completely or partially of a fiber composite. To make the carrier bars 14 even lighter, the rods 21, 22 may also be designed as hollow rods. This also applies for the rods of the other embodiments.

Figure 6:
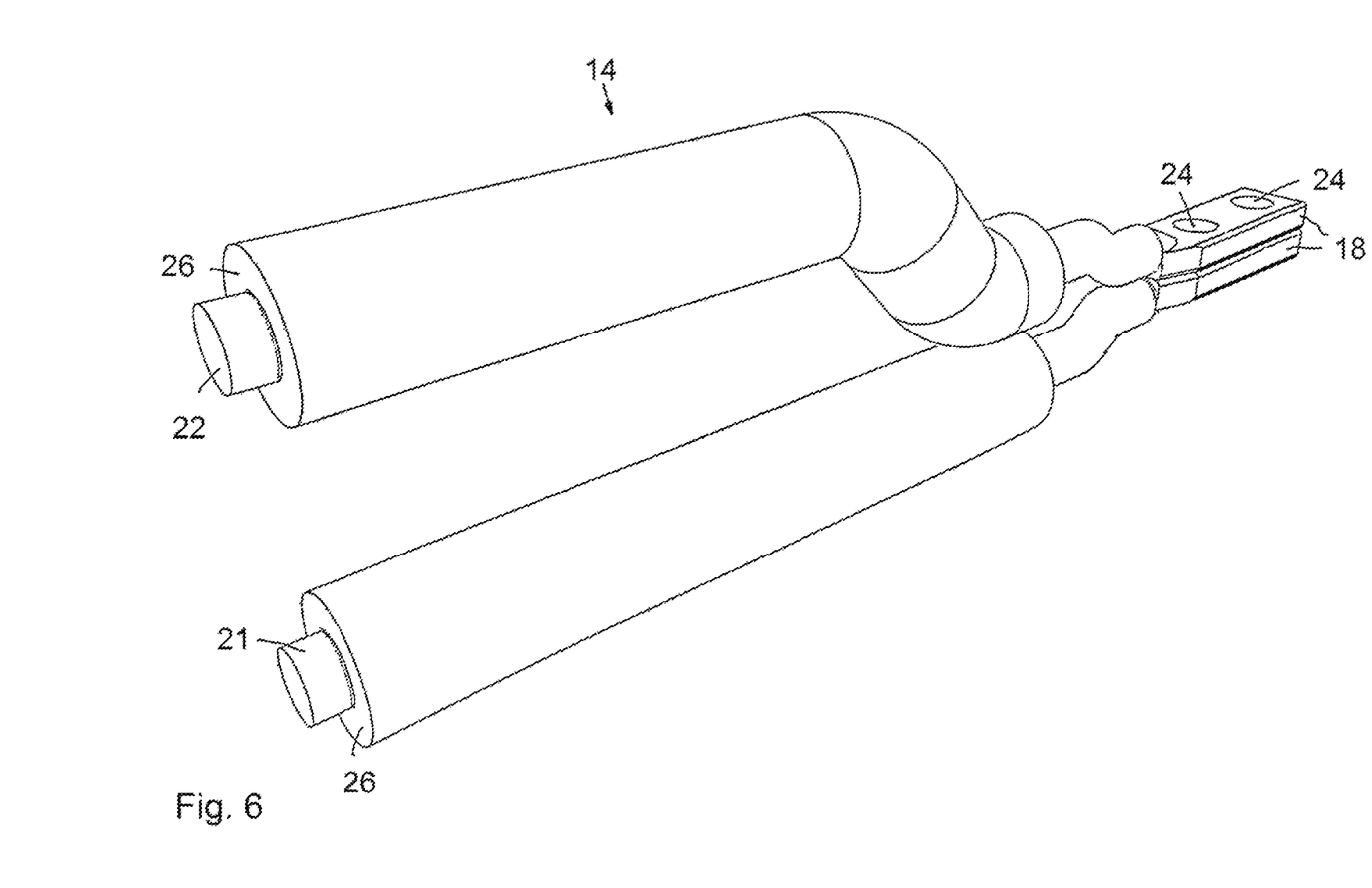
FIG. 6 shows a perspective view of a carrier bar according to a fourth embodiment of the invention.

In the embodiment according to FIG. 5, a third rod could be added if it is not possible to achieve at least a 30% overlap of the smallest internal cross section of the undershot conveyor duct 9.1. However, the conveying cross section may also be enlarged by providing the two rods 21, 22 with a concentric casing 26, as illustrated in FIG. 6. This casing 26, the same as for the other embodiments, is made of a material which increases friction.

In all the embodiments, the casing 19, 23, 26 may be vulcanized onto the rods 17, 22, 23, or the casings 19, 23, 26 are extruded profiles which are pushed onto the rods 17, 21, 22 and optionally integrally joined to same.

The invention claimed is:

1. An inclined conveyor for a combine harvester, the inclined conveyor having a conveying direction, and comprising:
   a) a conveying duct, the conveying duct including an inlet and at least two drives revolving in the conveying duct,
   b) the conveying duct being divided into an overshot return duct and an undershot conveying duct by an intermediate floor situated between an upper run and a lower run of the two drives, and the intermediate floor extending to lateral walls of the conveying duct;
   c) the two drives being interconnected by carriers having carrier bars which are situated transversely with respect to the conveying direction of the inclined conveyor and which convey a harvested crop in the undershot conveying duct;
   d) the carrier bars, in addition to their property as carriers, are acceleration elements for the harvested crop, in that the cross section of each of the carrier bars viewed in the conveying direction, occupies at least 30% of the smallest internal cross section of the undershot conveying duct; and
   e) wherein, the undershot conveying duct, the intermediate floor extending to the duct, and the carrier bars occupying at least 30% of the smallest internal cross section of the undershot conveying duct act as a fan and produce a negative pressure at the inlet of the undershot conveying duct so that the harvested crop is thus additionally accelerated.

2. The inclined conveyor according to claim 1, wherein:
   a) the carrier bars have at least one rod with a circular cross section, the at least one rod having a casing which increases friction.

3. The inclined conveyor according to claim 2, wherein:
   a) the casing has the shape of a wing that is approximately perpendicular to the plane of the conveyor.

4. The inclined conveyor according to claim 1, wherein:
   a) the carrier bars have at least two rods having a circular cross section, and which are situated one on top of the other and are fastened as individual rods to the drives.

5. The inclined conveyor according to claim 4, wherein:
   a) the rods of a carrier bar have a shared fastening point to the drives.

6. The inclined conveyor according to claim 4, wherein:
   a) the rods are provided with a casing which increases friction.

7. The inclined conveyor according to claim 6, wherein:
   a) the casing is arranged concentrically with respect to the rods.

8. The inclined conveyor according to claim 6, wherein:
   a) the at least two rods have a shared casing in the form of a wing that is approximately perpendicular to the plane of the conveyor.

9. The inclined conveyor according to claim 2, wherein:
   a) the casing is joined to the at least one rod by an integral bond or by vulcanization.

10. The inclined conveyor according to claim 2, wherein:
    a) the rods are produced from cold-drawn wire or hot-rolled, tempered wire.

11. The inclined conveyor according to claim 2, wherein:
    a) the rods are hollow.

12. The inclined conveyor according to claim 2, wherein:
    a) the rods are made completely or partially of a fiber composite.

13. An inclined conveyor for a combine harvester, the inclined conveyor having a conveying direction, and comprising:
    a) a conveying duct, the conveying duct including an inlet and at least two drives revolving in the conveying duct, the at least two drives including an upper run and a lower run;
    b) an intermediate floor being provided, and the conveying duct being divided into an overshot return duct and an undershot conveying duct by the intermediate floor situated between the upper run and the lower run, and the intermediate floor extending to lateral walls of the conveying duct;
    c) the at least two drives being interconnected by carriers having carrier bars which are situated transversely with respect to the conveying direction of the inclined conveyor and which convey a harvested crop in the undershot conveying duct;
    d) the carrier bars are acceleration elements for the harvested crop, the cross section of each of the carrier bars, as viewed in the conveying direction, occupies at least 30% of the smallest internal cross section of the undershot conveying duct; and
    e) wherein, the undershot conveying duct, the intermediate floor extending to the duct, and the carrier bars occupying at least 30% of the smallest internal cross section of the undershot conveying duct act as a fan and produce a negative pressure at the inlet of the undershot conveying duct so that the harvested crop is thus additionally accelerated.

14. The inclined conveyor according to claim 13, wherein:
    a) the carrier bars have at least one rod with a circular cross section, the at least one rod having a casing which increases friction.

15. The inclined conveyor according to claim 14, wherein:
    a) the at least one rod is made completely or partially of a fiber composite.

* * * * *